United States Patent [19]
Götze et al.

[11] 4,035,076
[45] July 12, 1977

[54] PHOTOGRAPHIC COPYING MACHINE

[75] Inventors: Christian Götze; Adolf Fleck; Karl Dreher; Günther Heidrich, all of Munich, Germany

[73] Assignee: AGFA-Gevaert Aktiengesellschaft, Leverkusen, Germany

[21] Appl. No.: 645,910

[22] Filed: Dec. 31, 1975

Related U.S. Application Data

[62] Division of Ser. No. 369,457, Sept. 12, 1973, Pat. No. 3,946,922.

[30] Foreign Application Priority Data

Sept. 13, 1972 Germany .......................... 2244960

[51] Int. Cl.² ...................................... G03B 27/58
[52] U.S. Cl. ................................................ 355/72
[58] Field of Search ............... 355/18, 19, 21, 125, 355/72

[56] References Cited

U.S. PATENT DOCUMENTS

| | | | |
|---|---|---|---|
| 1,981,406 | 11/1934 | Young | 355/72 X |
| 3,369,449 | 2/1968 | Klauss et al. | 355/18 |
| 3,414,353 | 12/1968 | Schwardt | 355/18 X |
| 3,712,732 | 1/1973 | Lederer | 355/72 |

FOREIGN PATENT DOCUMENTS 357,563  3/1938  Italy .................................. 355/72

Primary Examiner—Donald A. Griffin
Attorney, Agent, or Firm—Michael J. Striker

[57] ABSTRACT

A photographic copying machine wherein the leader of a fresh web of photographic paper is automatically threaded through a copying station and thereupon through one or more additional stations whereby the leader advances along an elongated path which is defined by stationary and pivotable guide members. Each pivotable guide member is movable by an electromagnet between an operative position in which it overlies at least a portion of an opening provided by the adjacent stationary guide member or members and an inoperative position in which the respective opening is exposed. Pivotable guide members are provided at a copying station where the web is exposed to printing light and at a feeding station where the web can form one or more loops in a suitable magazine when the respective pivotable guide member is moved to its inoperative position. One or more pivotable guide members can be yieldably retained in the respective operative positions by elastic or yieldably mounted locking bolts at least one of which can be disengaged from the respective pivotable guide member by an electromagnet or in response to the application of a predetermined force which acts against the respective pivotable guide members in a direction to move it to the inoperative position.

2 Claims, 3 Drawing Figures

PHOTOGRAPHIC COPYING MACHINE

This is a division of application Ser. No. 369,457, filed Sept. 12, 1973 and now U.S. Pat. No. 3,946,922.

BACKGROUND OF THE INVENTION

The present invention relates to improvements in apparatus wherein an elongated web consisting of paper or other flexible material is fed lengthwise through a plurality of successive stations, especially to improvements in photographic copying machines wherein a web of photographic papaer is movable stepwise to place successive portions of a layer of photosensitive material into register with a window or opening at the copying station. More particularly, the invention relates to improvements in means for guiding the web during threading and during intermittent transport.

In certain presently known photographic copying machines, the marginal portions of a web of photographic paper extend into channels or recesses of lateral guide members. Such channels flank not only those portions of the path for the web where the web is confined from two sides but also those portions where the web is exposed, for example, the window at the copying station. A drawback of such channeled guide members is that at least one thereof must be adjusted whenever a relatively wide web is followed by a narrower web, or vice versa. The mechanism for moving one or both channeled guide members is complex, bulky and expensive, especially if it is to automatically adjust the path for satisfactory guidance of webs having different widths. Moreover, such channeled guide members cannot serve for satisfactory guidance of webs of photographic paper which are used for the making of margin-free prints. Thus, the marginal portions of such webs cannot be guided all the way through the copying machine because the printing light must reach the full width of that portion of the web which is located at the copying station.

SUMMARY OF THE INVENTION

An object of the invention is to provide a novel and improved apparatus wherein webs of photographic paper or the like are transported lengthwise through and beyond one, two or more stations and wherein that portion of a web which is located at one or more stations must be exposed all the way between its edges, for example, during the exposure of a web of photographic paper to printing light for the purpose of making a series of margin-free prints.

Another object of the invention is to provide the apparatus with novel and improved guide means for webs of photographic paper or the like.

A further object of the invention is to provide a photographic copying machine with novel and improved means for guiding the leader of a fresh web of photographic paper during threading of the web through and beyond a copying station and one or more aditional stations.

An additional object of the invention is to provide a photographic copying machine wherein the marginal portions of the web need not be confined in channels, at least while the web is being advanced through the copying station.

Still another object of the invention is to provide a photographic copying machine with novel and improved means for protecting the web at the copying station from printing light during intervals between successive operations of the copying machine.

Another object of the invention is to provide the copying machine with novel and improved means for sealing the inlet to the magazine for exposed photographic paper downstream of the printing or copying station.

The invention is embodied in an apparatus wherein an elongated web of paper or the like is fed lengthwise, especially in a photographic copying machine. The apparatus comprises transporting means for advancing a web lengthwise, either continuously or in stepwise fashion, and novel and improved guide means defining for the advancing web an elongated path wherein the web advances through and beyond a series of seccessive stations.

The guide means comprises first guide members (e.g., one or more pressure plates, masks, stationary sheet metal plates, ladder-shaped or otherwise configurated apertured members, and/or others) which are adjacent to opposite sides of the path and provide at least one opening (e.g., a window at the copying station of a photographic copying machine) which affords access to the path or enables the web to bulge from the path, at least one second guide member (e.g., a pivotable flap) which is movable between operative and inoperative positions in which it respectively overlies and exposes the opening provided by the first guide members, and electromagnetic or other means for moving the second guide member between operative and inoperative positions so that the second guide member assumes and dwells in the operative position during threading of the leader of a fresh web along the path.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
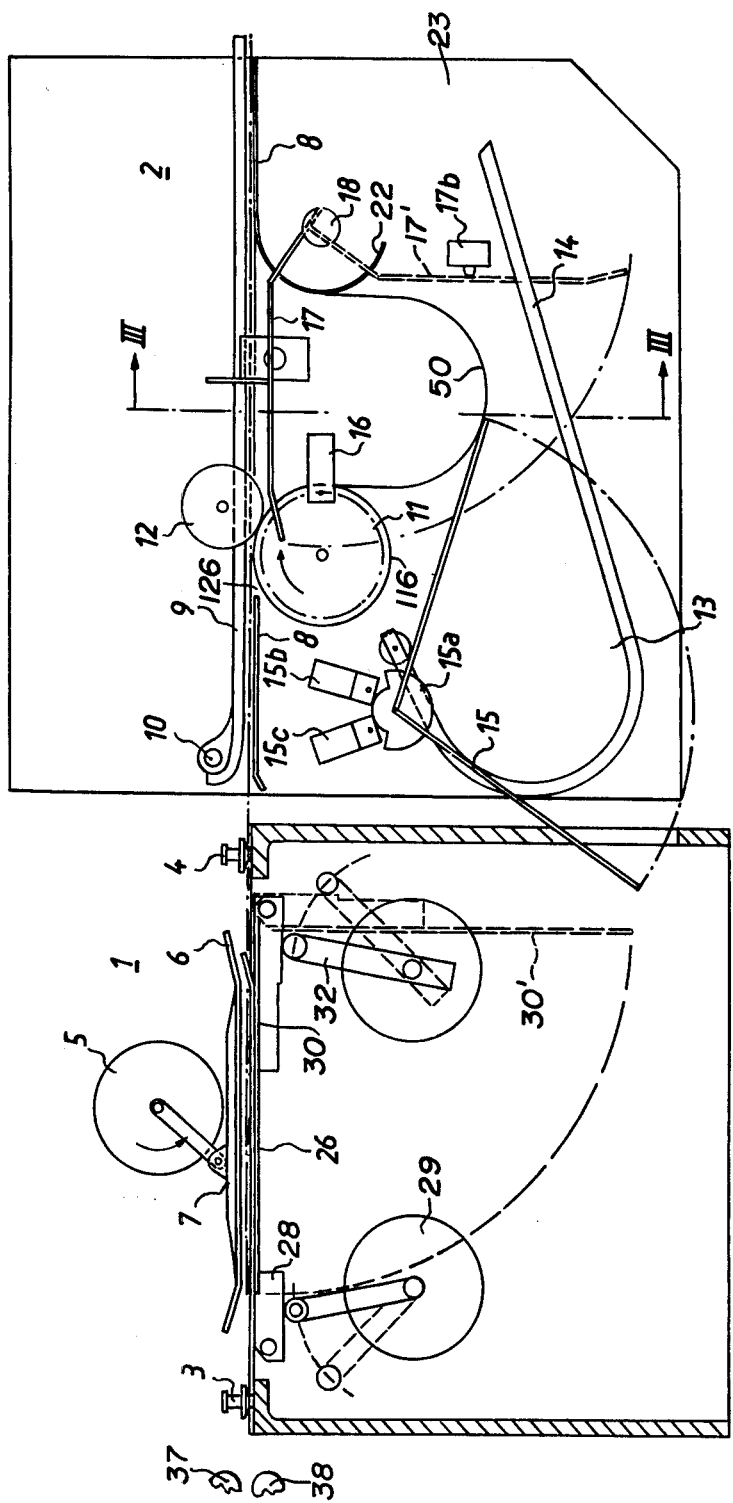
FIG. 1 is a diagrammatic partly elevational and partly vertical sectional view of an apparatus which constitutes a photographic copying machine and wherein the guide means for a web of photographic paper is constructed and assembled in accordance with the present invention.

FIG. 1 illustrates a portiion of a photographic copying machine wherein a web 50 of paper, one side of which is coated with a layer of photosensitive material, is transported in a direction from the left to the right. The web 50 advances along an elongated path which extends first through a copying station 1 and thereupon through a web feeding station 2. A second feeding station which is preferably similar to the station 2 is provided ahead of the copying station 1; its pupose is to accumulate upstream of the copying station 1 a supply of web 50 which suffices to insure that the web transporting mechansim at the station 2 can draw requisite lengths of web in order to place unexposed portions of photosensitive layer into register with a window or opening 26 where such portions are exposed to light passing through an original, now shown. The purpose of the transporting mechanism at the station 2 is to advance the web 50 through predetermined distances whereas the second sheet transporting mechanism (upstream of the copying station 1) merely insures that the web 50 is available in requisite lengths for transport through the copying station 1. As a rule, the second transporting mechanism is designed to fill a magazine (not shown) upstream of the copying station 1 to such an extent that a sufficient length of the web 50 is available whenever the mechanism at the feeding station 2 is set in motion.

The parts at the copying station 1 include at least two pairs of stationary guide elements 3, 4 which engage the marginal portions of the web 50 to hold it against sidewise movement from the path in which the web must remain in order to properly register with the opening or window 26. The construction and mounting of guide members 3, 4 are preferably identical with or similar to those described in German Offenlegungsschrift No. 2,039,205.

A rotary electromagnet 5 is mounted at a level above the window 26 to serve as a means for raising and lowering a pressure plate 6 through the intermediary of one or more leaf springs 7 or analogous yieldable biasing means. The pressure plate 6 can engage the front and rear portions of that length of the web 50 which overlies the window 26 to hold the web in a predetermined plane during exposure to light which has passed through or has been reflected by an original. Additional means (not specifically shown) are provided to maintain the entire web portion which overlies the window 26 in the aforementioned predetermined plane while the web is being exposed to light. Such additional means may comprise suitable clamping elements which engage the web 50 in the region of the longitudinally extending portions of the window 26.

When the making of an exposure is completed, the rotary electromagnet 5 lifts the pressure plate 6 above and away from the window 26 so that the plate 6 is located directly above a gap which is wide enough to allow for unimpeded transport of the web 50 in a direction toward the feeding station 2.

Figure 2:
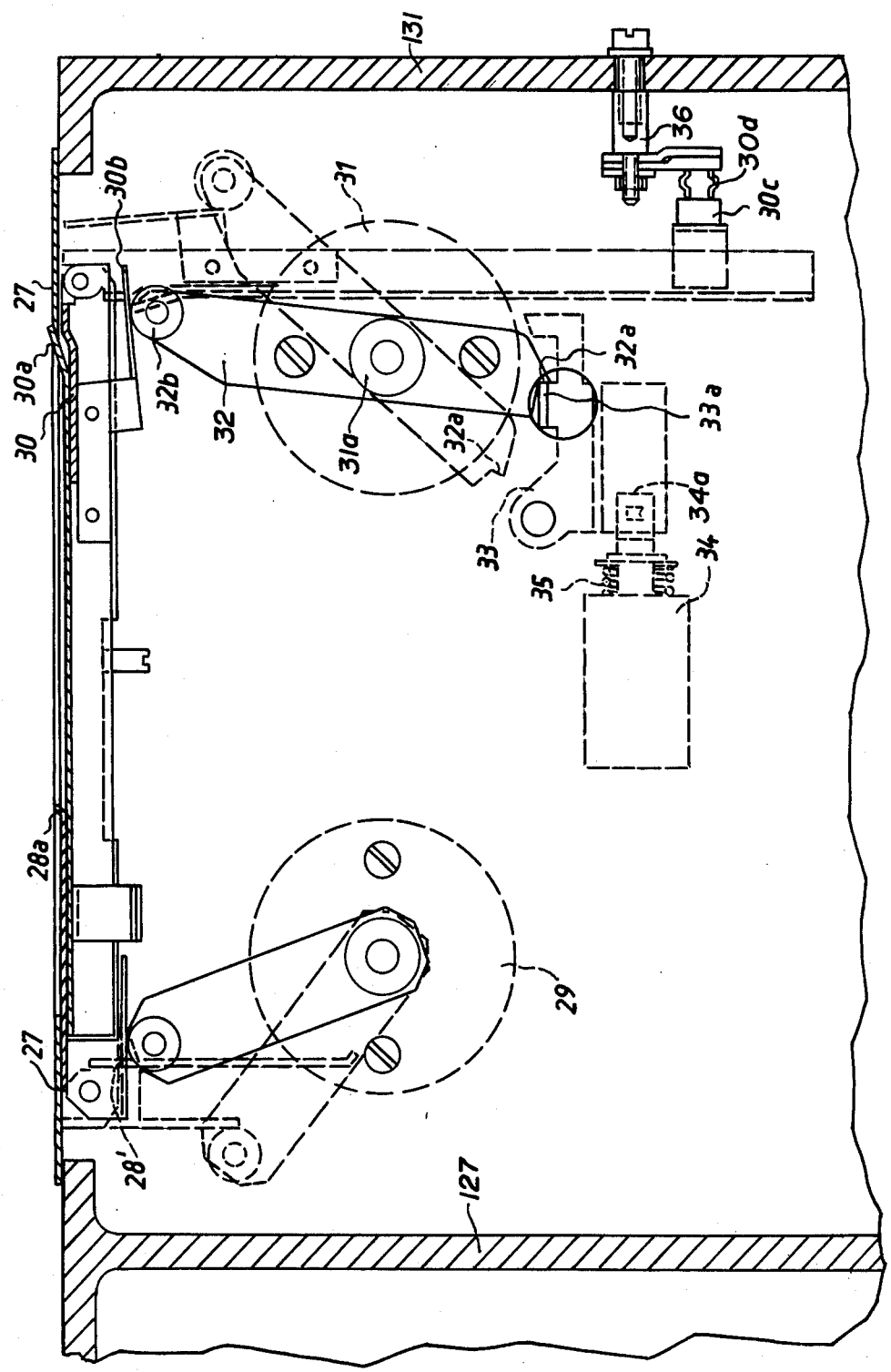
FIG. 2 is an enlarged view of a detail in the apparatus of FIG. 1.

The copying station 1 further accommodates two movable guide members or flaps 28 and 30 as well as means for moving the flaps to and from operative positions. The details of the flaps 28, 30 and of the moving means therefor are shown in FIG. 2.

The parts at the feeding station 2 comprise stationary lower guide members 8 which may consist of sheet metal and are preferably perforated to allow for descent of minute particles or specks of paper which are rubbed off the web 50. The guide members 8 are adjacent to the underside of the path for the web 50 and are mounted opposite an upper guide member 9 which preferably resembles a ladder and includes a pair of longitudinally extending rod-like sidepieces 9a, 9b (FIG. 3) and crosspieces or rungs 9c. The rungs 9c are connected to the upper sides of the sidepieces 9a, 9b so that they do not come into contact with the web 50. The left-hand ends of the sidepieces 9a, 9b (as viewed in FIG. 1) are articulately connected to the frame of the copying machine by means of a suitable hinge 10 so that the entire upper guide 9 can be pivoted above and away from the path for the web 50, for example, when an attendant wishes to clean the web feeding station 2.

The lower guide members 8 define an opening 126 wherein the web 50 advances through the nip of two intermittently rotating transporting wheels 11 and 12. The lower transporting wheel 11 is driven at intervals by a mechanism which is not shown in the drawing, and the upper transporting wheel 12 is biased toward the lower wheel 11 by means of suitable springs, not shown. The transporting wheel 11 is rotated clockwise, as viewed in FIG. 1, upon completion of an exposure and advances the web 50 through a predetermined distance so as to place a fresh portion of the web into register with the window or opening 26 at the copying station 1.

Figure 3:
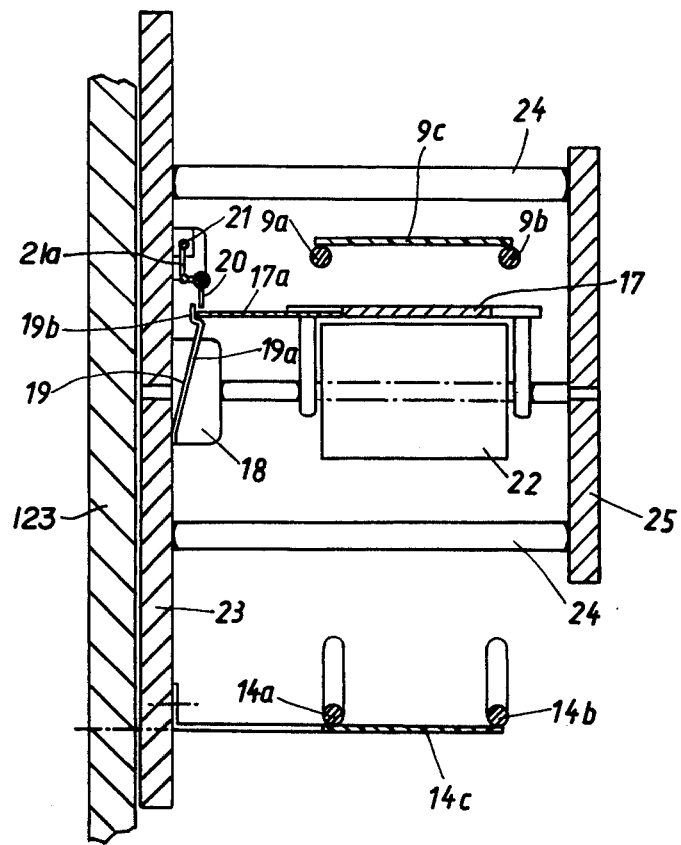
FIG. 3 is a transverse vertical sectional view as seen in the direction of arrows from the line III—III of FIG. 1.

A magazine 13 for a floating supply of exposed web 50 is provided at the station 2 behind the transporting wheels 11, 12. The magazine 13 resembles an open basket the underside of which is bounded by arcuate confining means 14 resembling the upper guide member 9. As shown in FIG. 3, the confining means 14 comprises two highly polished rod-like sidepieces 14a, 14b and spaced-apart transversely extending crosspieces or rungs 14c which are welded or otherwise secured to the sidepieces. The underside of the web portion in the magazine 13 contacts the upper sides of the sidepieces 14a, 14b. The distance between the sidepieces 14a, 14b is at least slightly less than the minimum width of a web 50. The capacity of the magazine 13 depends on the availability of space at the feeding station 2 and is preferably selected in such a way that the magazine can store a substantial length of looped web stock. The quantity of web stock in the magazine 13 is monitored by a detector 15 which is pivotable in the frame of the copying machine about a horizontal axis extending in parallelism with the axis of the transporting wheel 11. The detector 15 can rotate an opaque van 15a which can interrupt the light beams between the light sources and photosensitive elements of two photoelectric sensors 15b, 15c. When the length of the loop of web 50 in the magazine 13 is reduced to a predetermined minimum length, the vane 15a interrupts the light beam of the sensor 15b which produces an electric signal. The sensor 15c produces a signal when the magazine 13 is filled to capacity. The detector 15 may consist of one or more pieces of round spring steel stock.

A second detector 16 is provided to monitor the extent of angular displacement of the transporting wheel 11. This detector also comprises a light source and a photosensitive receiver. The light beam issuing from the source of the detector 16 can pass through successive apertures of a disk 116 which is rotated by the transporting wheel 11. The detector 16 produces impulses which are counted by a suitable counter (not shown) serving to arrest the drive for the transporting wheel 11 when the magazine 13 receives a requisite length of the web 50. The apertures of the disk 116 are preferably distributed in such a way that the distance between the centers of two neighboring apertures is less than or equals ¼-inch. The light sources of the sensors 15b, 15c and detector 16 preferably furnish light beams in the nonactinic range of the spectrum.

The magazine 13 has an inlet opening (part of the opening 126) which extends between the transporting wheel 11 and an arcuate shroud 22 and can be overlapped by a pivotable guide member or flap 17 the operative position of which is indicated in FIG. 1 by solid lines. When permitted to descend and to assume the inoperative position 17', the flap 17 actuates an electric microswitch 17b which is mounted in the frame of the copying machine. The mounting of the flap 17 is such that it can bypass the detector 15 and the crosspieces 14c of the confining means 14. The flap 17 is allowed or caused to assume the inoperative position 17' while the copying machine exposes a length of the web 50 to printing light at the copying station 1. The means for pivoting the flap 17 to the operative position of FIG. 1 comprises a rotary electromagnet 18 which is mounted in the frame of the copying machine downstream of the transporting wheel 11 and is partially surrounded by the aforementioned shroud 22 whose convex outer side enables the web 50 to form a large loop in the interior of the magazine 13.

In order to reduce the dimensions and the energy requirements of the electrogmagnet 18, the copying machine is preferably provided with a yieldable locking member for releasably holding the flap 17 in the solid-line operative position of FIG. 1. Such locking member comprises a leaf spring 19 (see FIG. 3) which is mounted on a rear platen 23 of the machine frame and has an inclined cam surface 19a as well as a shoulder or ledge 19b for a lateral extension 17a of the flap 17. When the electromagnet 18 pivots the flap 17 in a counterclockwise direction, as viewed in FIG. 1, the extension 17a slides along the inclined surface 19a and causes the leaf spring 19 to yield. The extension 17a then reaches and comes to rest on the shoulder 19b whereby the flap 17 is held in the operative position as long as the leaf spring 19 remains in the position shown in FIG. 3. Thus, the electromagnet 18 can be deenergized as soon as the extension 17a reaches the shoulder 19b. The means for disengaging the shoulder 19b from the extension 17a so that the flap 17 can descend by gravity includes an electromagnet 21 having a rotary armature 21a which carries an actuating element 20 adapted to engage the adjacent tip of the leaf spring 19 and to move the shoulder 19b in a direction to the left, as viewed in FIG. 3, when the electrogmagnet 21 in energized. The element 20 can pivot clockwise relative to the armature 21a so that it can bypass the tip of the leaf spring 19 when the electromagnet 21 is deenergized and the armature 21a returns to the idle position of FIG. 3.

The elasticity and configuration of the leaf spring 19 (especially of the shoulder 19b) are preferably selected in such a way that the extension 17a can pivot the leaf spring 19 counterclockwise, as viewed in FIG. 3, when the web 50 applies a predetermined pressure against the upper side of the flap 17. Thus, the shoulder 19b can be disengaged from the extension 17a in response to energization of the electromagnet 21 or in response to application of a predetermined pressure against the flap 17 in a direction to pivot the flap toward the inoperative position 17'.

The frame of the copying machine comprises the aforementioned rear platen 23 and a relatively small front platen 25 which is parallel with and is secured to the platen 23 by horizontal distancing bolts 24 or the like (see FIG. 3). The platen 23 is bolted, screwed or otherwise fastened to a stationary supporting wall 123. In FIG. 1, the front platen 25 has been omitted for the sake of clarity; this platen serves to support certain movable parts of the copying machine, such as the shafts of transporting wheels 11, 12, one end portion of the pintle of the hinge 10, the respective marginal portions of guide members 8, one end of the rotary armature of the electromagnet 18, and one end of the pivot means for the detector 15.

FIG. 2 shows that the window or opening 26 is surrounded by an opaque mask 27. The left-hand portion of the mask 27 rests on a frame member 127 and is located at a level above the pivotable guide member of flap 28 which can be moved between an operative or extended position (shown by solid lines) and an inoperative or retracted position 28' (shown by broken lines). The means for moving the flap 28 between the operative and inoperative positions comprises a rotary electromagnet 29 which is mounted on the frame member 127 or on another part of the machine frame. The flap 28 dwells in the operative position as long as the electromagnet 29 remains energized. The construction of the flap 28 is such that it can engage the underside of the adjacent portion of the mask 27 in an absolutely lighttight manner. The rightmost end 28a of the flap 28 is provided with an upwardly inclined surface which guides the leader of the web 50 over eventual obstructions in the region where the flap 28 overlies a portion of the larger second pivotable guide member or flap 30. This is important during threading of the web 50 through the copying machine.

The flap 28 constitutes an optional feature of the copying machine; its purpose is to reduce the effective size of the opening or window 26 when the operator wishes to make relatively small prints. In other words, the effective length of the window 26 (as considered in the direction of movement of the web toward and beyond the transporting wheels 11, 12) is reduced when the electromagnet 29 is energized in order to pivot the flap 28 to the operative position.

The second flap 30 at the copying station 1 is large enough to overlie the entire window 26. The operative and inoperative positions of the flap 30 are respectively indicated by solid lines and by broken lines (as at 30'). The upper side of the flap 30 is provided with preferably labyrinth-shaped sealing means (not specifically shown) which can engage the underside of the mask 27 to thus prevent the passage of any light through the window 26 irrespective of the position of the flap 28. The right-hand end portion of the flap 30 (as viewed in FIG. 2 and assuming that the flap 30 dwells in the operative position) is provided with an inclined surface 30a which guides the leader of a web 50 over obstructions, if any, in the region where the parts of the flap 30 and mask 27 meet.

The means for moving the flap 30 comprises a rotary electromagnet 31 which is mounted in or on a frame member 131 of the copying machine and comprises an armature 31a having an arm 32 provided with a roller 32b which can travel along and thereby pivots a platelike portion 30b of the flap 30. The lower portion of the arm 32 has a projection or tooth 32a which can engage a complementary tooth or shoulder 33a on a pivotable locking member 33 so that the electromagnet 31 can be deenergized as soon as the flap 30 reaches its operative position in which the tooth 32a engages the shoulder 33a. The bolt 33 is biased to the illustrated position by a helical spring 35 and can be pivoted to move the shoulder 33a away from the path of the tooth 32a in response to energization of an electromagnet 34. The armature 34a of the electromagnet 34 is articulately connected to the locking bolt 33 and the spring 35 is free to expand and to return the bolt 33 to the illustrated position as soon as the electromagnet 34 is deenergized.

When the electromagnet 34 is deenergized (and the electromagnet 31 is also deenergized), the flap 30 can descend by gravity and is arrested in the inoperative position 30' by a stop 36 on the frame member 131. An elastic cushion 30c of the flap 30 strikes against the stop 36 shortly before the flap 30 reaches the inoperative position 30'. The cushion 30c preferably comprises a bellows 30d which yields in response to impact against the stop 36. Furthermore, the stop 36 preferably comprises a permanent magnet which attracts a soft iron plate (not shown) of the cushion 30c or flap 30 to thus prevent a rebounding of the flap when the cushion 30c strikes against the stop 36.

The parts 6, 27, 8 and 9 constitute a set of first guide members which flank the path for the web 50 from above and from below and provide two openings (26 and 126) which can be overlapped by the movable second guide members or flaps 28, 30 and 17 in the operative positions of such flaps. In the illustrated copying machine, the openings 26, 126 are located at the underside of the path for the web 50; however, it is equally within the purview of the invention to assemble the first fuide members in such a way that they provide one or more openings at the underside and/or one or more openings at the upper side of the path for the web 50.

The ratio of that portion of the opening 26 which can be overlapped by the flap 28 to the full length of the opening 26 (as considered in the direction in which the web 50 can be transported by the wheels 11, 12) is preferably 1: $\sqrt{2}$.

The operation is as follows:

The flaps 17 and 30 assume their operative positions prior to threading of the leader of a fresh web 50 through the copying station 1 and thereupon through the feeding station 2. The flap 28 is held in the operative position only if the copying machine is to make the relatively small prints. The leader of a fresh web 50 is transported into the copying station 1 by a pair of advancing or transportion rolls 37, 38 (shown at the left-hand end of FIG. 1) whereby such leader advances in a channel whose upper side is bounded by the mask 27, pressure plate 6 and guide member 9, and whose underside is bounded by the stationary guide members 8 and flaps 30, 17 (and eventually also by the flap 28). This insures that the leader of the web 50 cannot leave the path by moving upwardly or downwardly. The lateral guide elements 3, 4 prevent the leader from moving sideways. In this way, the rolls 37, 38 compel the leader of the fresh web 50 to enter the nip of the transporting wheels 11 and 12. This completes the threading operation because the web 50 is thereupon transported in response to intermittent rotation of the wheel 11 through angles of predetermined magnitude. If desired, the rolls 37, 38 can advance the leader of the web 50 all the way into a cassette (not shown) which is located behind the station 2.

If the web 50 jams during further transport through the copying machine for one or more unforeseen reasons, i.e., if such jamming takes place downstream (to the right) of the feeding station 2, the wheel 11 can continue to transport the web 50 stepwise in cooperation with the wheel 12 whereby the web 50 forms waves in the space between the pivotable guide member 9 and the flap 17. The guide member 9 is not supposed to yield to gradually increasing pressure of the meandering web 50 but the flap 17 does as soon as the pressure against its upper side reaches a value which is needed to automatically pivot the leaf spring 19 through the intermediary of the extension 17a so that the latter moves downwardly and slides along the surface 19a during movement of the flap 17 to the inoperative position 17'. The flap 17 thereby actuates the switch 17b which causes a suitable arresting device (not shown) to arrest the drive for the transporting wheel 11 and which further causes an indicating device (not shown) to furnish a visible or audible indication that the copying machine requires attention, i.e., that the operator or operators should eliminate the cause of jamming downstream of the feeding station 2. The signal from the switch 17b does not result in stoppage of the transporting wheel 11 or in the generation of a visible or audible indication when the flap 17 assumes the inoperative position 17' while the means for transporting the web 50 operates normally, e.g., when the flap 17 is disengaged from the spring 19 by the electromagnet 21.

When the threading of a fresh web 50 (without jamming) is completed, the electromagnets 21 and 34 are energized for short intervals of time so as to disengage the leaf spring 19 from the extension 17a and to disengage the shoulder 33a of the locking bolt 33 from the tooth 32a whereby the flaps 17 and 30 are free to return to their inoperative positions by gravity. The copying machine is then ready for the making of prints in a manner which forms no part of the present invention.

The flaps 17 and 30 are returned to their operative positions when the supply of running web 50 is exhausted so that the rolls 37, 38 must thread the leader of a fresh web through the copying station 1 and into the nip of the transporting wheels 11, 12. Thus, the flaps 17 and 30 are held in the solid-line positions shown in FIGS. 1 and 2 only when the copying machine is idle.

The operator depresses a button on the control panel (not shown) to thereby energize the electromagnets 18 and 31 so that the flap 17 pivots clockwise simultaneously with the flap 30. The extension 17a reaches the slides along the surface 19a and ultimately reaches the shoulder 19b of the leaf spring 19 whereby the flap 17 remains in its operative position even if the electromagnet 18 is deenergized. Analogously, the flap 30 remains in its operative position (irrespective of the condition of the electromagnet 31) as soon as the tooth 32a engages the shoulder 33a of the locking bolt 33. The electromagnet 31 can pivot the flap 30 independently of the flap 28. The roller 32b on the arm 32 bears against the plate 30b of the flap 30 so that the latter sealingly engages the underside of the mask 27 at the copying station 1. The plate 30b is preferably elastic so that it can compensate for eventual tolerances in the dimensions and/or mounting of the flap 30 and/or arm 32. As mentioned above, the flap 30 can seal the entire window 26 irrespective of the position of the flap 28.

The flap 30 preferably performs an additional function, namely, to interrupt the beam of printing light below the window 26 when the copying machine is idle for relatively long intervals of time but the printing light remains on, for example, in order to insure that the color temperature of printing light does not deviate from an optimum color temperature. The printing light issuing from the lamp or lamps of the copying machine could adversely influence the photosensitive layer on that portion of the web 50 which extends through the copying station 1. To avoid this, the electromagnet 31 is energized for a relatively short interval of time which suffices to move the flap 30 to operative position in which the flap 30 is held by the locking bolt 33 and arm 32. To this end, the aforementioned control panel preferably comprises a separate switch which can be closed to energize the electromagnet 31 independently of the electromagnet 18 for the flap 17. The electromagnet 34 is energized for a short interval of time immediately prior to start of a copying operation (following a prolonged interruption) so that the locking bolt 33 is disengaged from the tooth 32a and the arm 32 allows the flap 30 to return the cushion 30c into abutment with the stop 36; the copying machine is then ready for the making of one or more prints. The flap 30 can seal the entire window 26 independently of the position of the flap 28, i.e., the flap 30 can engage the mask 27 from below during a longer interruption of the operation of copying machine regardless of whether the flap 28 dwells in the operative or in the inoperative position.

The versatility of the flap 30 contributes to the lower cost of the copying machine.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In the apparatus wherein an elongated web of paper or the like is fed lengthwise, particularly in a photographic copying machine, a combination comprising, transporting means for advancing a web lengthwise; and guide means defining for the advancing web an elongated path wherein the web advances through and beyond a plurality of successive stations including a copying station, said guide means including first guide members adjacent to opposite sides of said path and providing at least one opening at the copying station which affords access to said path, at least one second guide member movable between operative and inoperative positions in which said second guide member respectively overlies at least a portion of and exposes said opening, and means for moving said second guide member between said positions thereof, so that said second guide member assumes said operative position during threading of the leader of a fresh web along said path, said second guide member being provided with means for sealingly engaging at least one of said first guide members in said operative position thereof, said one first guide member including a mask surrounding said opening at said copying station, said opening being sealed against passage of light therethrough in said operative position of said second guide member.

2. In an apparatus wherein an elongated web of paper or the like is fed lengthwise, particularly in a photographic copying machine, a combination comprising transporting means for advancing a web lengthwise; and guide means defining for the advancing web an elongated path wherein the web advances through and beyond a plurality of successive stations including a copying station, said guide means including first guide members adjacent to opposite sides of said path and providing at least one opening at said copying station which affords access to said path, at least one second guide member movable between operative and inoperative positions in which said second guide member respectively overlies at least a portion of an exposed opening, means for moving said second guide member between said positions thereof so that said second guide member assumes said operative position during threading of the leader of a fresh web along said path, said second guide member being provided with means for sealingly engaging at least one of said first guide members in said operative position thereof, and means for effecting the movement of said second guide member to said operative position at the will of the operator so as to seal said opening against passage of light during intervals of idleness of said apparatus.

* * * * *